United States Patent [19]

Aoyama

[11] Patent Number: 5,745,315
[45] Date of Patent: Apr. 28, 1998

[54] PHASE ERROR DETECTOR AND MAGNETIC STORAGE DEVICE USING THE SAME

[75] Inventor: Morishige Aoyama, Tokyo, Japan

[73] Assignee: NEC Corporation, Tokyo, Japan

[21] Appl. No.: 742,484

[22] Filed: Nov. 1, 1996

[30] Foreign Application Priority Data

Nov. 17, 1995 [JP] Japan .................................. 7-299596

[51] Int. Cl.$^6$ .................................................. G11B 05/09
[52] U.S. Cl. .................................................. 360/65; 360/51
[58] Field of Search .......................... 360/65, 51; 333/18; 375/229, 230, 233

[56] References Cited

U.S. PATENT DOCUMENTS 5,420,884  5/1995  Inove .......................................... 375/229

FOREIGN PATENT DOCUMENTS 5-101549  4/1993  Japan .

OTHER PUBLICATIONS

F. Dolivo et al., "Performance and Sensitivity Analysis of Maximum-Likelihood Sequence Detection on Magnetic Recording Channels", *IFEE Transactions on Magnetics*, vol. 25, No. 5. Sep 1989, pp. 4072–4074.

F. Dolivo et al., "Fast Timing Recovery for Partial–Response Signaling Systems", *International Conference on Communication*, Jun. 1989, pp. 0573–0577.

*Primary Examiner*—Nabil Hindi
*Assistant Examiner*—Patrick Wamsley
*Attorney, Agent, or Firm*—Young & Thompson

[57] ABSTRACT

In the PRML, the probability of false locking of phase in a metastable state is reduced and the residual phase error between a readout signal and a clock signal used in an A/D conversion is eliminated by a phase detector (10) which comprises a level decision circuit 12 for determining one of a plurality of aimed equalization levels predetermined in the partial response signalling system which is the closest to a sampled value of an equalized waveform equalized substantially to the waveform of the partial response signalling system, a waveform gradient judge circuit (14) for determining a gradient of the equalized waveform on the basis of the aimed equalization level determined by the level decision circuit (12), an equalization error calculation circuit (16) for calculating an equalization error which is a difference between the sampled value of the equalized waveform and the aimed equalization level determined by the level decision circuit (12) and a phase error calculation circuit (18) for detecting a phase error on the basis of the equalization error calculated by the equalization error calculation circuit (16) and the gradient of the equalized waveform determined by the waveform gradient judge circuit (14).

8 Claims, 5 Drawing Sheets

PHASE ERROR DETECTOR AND MAGNETIC STORAGE DEVICE USING THE SAME

BACKGROUND OF THE INVENTION

The present invention relates to a phase error detector utilizing the partial-response maximum-likelihood (PRML) system and a magnetic storage device using the same phase error detector.

PRIOR ART DESCRIPTION

Partial-response maximum-likelihood (PRML) system has been known as a readout signal processing system suitable to increase recording density of a magnetic storage device, particularly, a magnetic disk drive. In the PRML system, a readout signal from a magnetic storage device is amplified and, after passed through a low-pass filter, A/D converted with a clock signal synchronized with the readout signal to obtain a digital waveform data sequence. A readout data sequence is obtained by equalizing the digital waveform data sequence and detecting a maximum likelihood sequence thereof. In this system, in order to synchronize the readout signal and the clock signal, a phase control circuit is used. The phase control circuit produces a clock signal by detecting a phase error between the readout signal and a sampling clock signal and controls the clock signal such that the phase error becomes zero by using a PLL control.

As the phase error detection system for detecting a phase error between a readout signal and a sampling clock, F. Dolivo et.al. proposed, on International Conference on Communication, pp. 18.5.1 to 18.5.5, June 1989, a technique in which a sampled value $y_n$ of an equalized waveform and $x_n$ resulting from ternary symbol-by-symbol decision of the sampled value are used to derive an equation:

$$\text{Phase Error} = -y_n x_{n-1} + y_{n-1} x_n$$

This technique will be referred to as "prior art 1", hereinafter.

As another system for detecting the phase error between a readout signal and a sampling clock, a technique is disclosed in Japanese Patent Application Laid-open No. H5-101549, in which a frequency component of a readout signal, after passed through an analog equalizer, is doubled by a full-wave rectifier and a frequency component having a frequency twice Nyquist rate is derived by a band-pass filter, etc., as a reference signal for a PLL circuit. This technique will be referred to as "prior art 2", hereinafter.

In the prior art 1, however, there are metastable points having phase difference of 180° in the PLL circuit and, when the phase is shifted to the metastable point due to an influence of such as noise, it may be locked at the metastable point. Such phenomenon is called as "false locking". When the false locking occurs, an error rate of the readout signal increases considerably.

In the prior art 2, residual phase error when a PLL is stable becomes relatively large since there is a difference in delay time between the readout signal processing from the low-pass filtering step up to the A/D conversion step and the signal processing from the equalizing step up to the acquisition step of the reference signal for the PLL circuit. A complete compensation for such difference of delay time by means of a delay circuit, etc., is difficult due to variation of circuit characteristics and fluctuation of temperature, etc.

SUMMARY OF THE INVENTION

An object of the present invention is to provide, in the PRML system, a phase detector capable of substantially reducing the probability of occurrence of false locking and eliminating residual phase error between a readout signal and an A/D converting clock signal and to provide a magnetic storage device using the same phase detector, which is highly reliable in view of read error.

A phase detector according to the present invention comprises a level decision circuit for determining one of a plurality of aimed equalization levels predetermined in the partial response signalling system which is the closest to a sample value of an equalized waveform equalized substantially to the waveform of the partial response signalling system, a waveform gradient judge circuit for determining a gradient of the equalized waveform on the basis of the aimed equalization level determined by the level decision circuit, an equalization error calculation circuit for calculating an equalization error which is a difference between the sample value of the equalized waveform and the aimed equalization level determined by the level decision circuit and a phase error detector circuit for detecting a phase error on the basis of the equalization error calculated by the equalization error calculation circuit and the gradient of the equalized waveform determined by the waveform gradient judge circuit.

A magnetic storage device according to the present invention comprises an equalizer for substantially equalizing a readout signal waveform from a magnetic head to a waveform of the partial response signalling system, a voltage controlled oscillator for generating a sampling clock signal, a sampler for sampling the equalized signal waveform from the equalizer synchronized with the sampling clock signal from the voltage controlled oscillator, a level decision circuit for determining one of a plurality of aimed equalization levels determined in the partial response signalling system which is the closest to a sampled value of an equalized waveform equalized substantially to the waveform of the partial response signalling system, a waveform gradient judge circuit for determining a gradient of the equalized waveform on the basis of the aimed equalization level determined by the level decision circuit, an equalization error calculation circuit for calculating an equalization error which is a difference between the sampled value of the equalized waveform and the aimed equalization level determined by the level decision circuit, a phase error calculation circuit for detecting a phase error on the basis of the equalization error calculated by the equalization error calculation circuit and the gradient of the equalized waveform determined by the waveform gradient judge circuit and a loop filter for producing a control signal for controlling the oscillation frequency of the voltage controlled oscillator on the basis of the phase error.

The waveform gradient judge circuit is preferably has any one of the following functions:

(1) The waveform gradient judge circuit determines a gradient of the equalized waveform as having a value which is one of +1, 0 and −1. The phase error calculation circuit outputs the equalization error as the phase error when the gradient value is +1, outputs 0 as the phase error when the gradient value is 0 and outputs an inversion of the equalization error as the phase error when the gradient value is −1.

(2) The class IV partial response system in which the aimed equalization levels are 1, 0 and −1 is used and the sequence of aimed equalization levels determined by the level decision circuit is set to . . . , $x_{n-1}$, $x_n$, $x_{n+1}$, . . . The waveform gradient judge circuit determines the gradient of waveform at a time instance n as follow:

If $x_{n-1} = -1$ and $x_n = 1$ and $x_{n+1} = 1$, then +1;
If $x_{n-1} = 0$ and $x_n = 1$ and $x_{n+1} = 1$, then +1;
If $x_{n-1} = 0$ and $x_n = 0$ and $x_{n+1} = 1$, then +1;
If $x_{n-1} = -1$ and $x_n = 0$ and $x_{n+1} = 1$, then +1;
If $x_{n-1} = -1$ and $x_n = 0$ and $x_{n+1} = 0$, then +1;
If $x_{n-1} = -1$ and $x_n = -1$ and $x_{n+1} = 1$, then +1;
If $x_{n-1} = -1$ and $x_n = -1$ and $x_{n+1} = 0$, then +1;
If $x_{n-1} = 1$ and $x_n = -1$ and $x_{n+1} = -1$, then -1;
If $x_{n-1} = 0$ and $x_n = -1$ and $x_{n+1} = -1$, then -1;
If $x_{n-1} = 0$ and $x_n = 0$ and $x_{n+1} = -1$, then -1;
If $x_{n-1} = 1$ and $x_n = 0$ and $x_{n+1} = -1$, then -1;
If $x_{n-1} = 1$ and $x_n = 0$ and $x_{n+1} = 0$, then -1;
If $x_{n-1} = 1$ and $x_n = 1$ and $x_{n+1} = -1$, then -1;
If $x_{n-1} = 1$ and $x_n = 1$ and $x_{n+1} = 0$, then -1;
Otherwise, 0.

(3) The sequence of aimed equalization levels determined by the level decision circuit is set to $\ldots, x_{n-1}, x_n, x_{n+1}, \ldots$. The waveform gradient judge circuit determines the gradient of waveform at a time instance n as follow:

If $x_{n+1} > x_{n-1}$, then +1;
If $x_{n+1} = x_{n-1}$, then 0;
If $x_{n+1} < x_{n-1}$, then -1.

The level decision circuit-determines one of a plurality of aimed equalization levels determined in the partial response signalling system which is the closest to a sampled value of an equalized waveform. The equalization error is a difference between the sampled value of the equalized waveform and the aimed equalization level determined. A waveform gradient is obtained from the sequence of the aimed equalization levels. When the sequence is of -1, 0, +1, the gradient is determined as +1 since the gradient of equalized waveform at a center time instance is positive. When the sequence is of 0, 1, 0, the gradient is determined as 0 since the sigh of the gradient value of the equalized waveform at the center time instance is not determined simply.

When the gradient of the equalized waveform is positive, the equalization error is negative if the sampling phase is advanced and is positive if it is delayed. On the contrary, when the gradient of the equalized waveform is negative, the equalization error is positive if the sampling phase is advanced and is negative if it is delayed. Therefore, when the gradient of the equalized waveform is positive, the equalization error can be deemed as the phase error of the sampling clock signal, and, when the gradient of the equalized waveform is negative, an inversion of the equalization error can be deemed as the phase error of the sampling clock signal. When the gradient of the equalized waveform is not indefinate, the waveform gradient judge circuit outputs 0 so that the equalization error is not reflected back to the phase control.

The phase error thus obtained is passed through a loop filter and is used as the control voltage for controlling the voltage controlled oscillator. The equalized waveform is sampled with the clock signal from the voltage controlled oscillator. The control voltage controls the voltage controlled oscillator such that the output clock signal thereof is delayed when the phase of the output clock signal is advanced with respect to that of the equalized waveform and is advanced when the phase of the output clock signal is delayed with respect to the equalized waveform. Therefore, the sampling can be performed with the clock signal having phase synchronized with that of the equalized waveform, resulting in precisely sampled values of the equalized waveform.

BRIEF DESCRIPTION OF THE DRAWINGS

The novel features believed characteristics of the present invention are set forth in the appended claims. The present invention itself, however, as well as other features and advantages thereof, will be best understood by reference to the detailed description which follows, read in conjunction with the accompanning drawings, wherein:

DESCRIPTION OF THE PREFERRED EMBODIMENTS

Figure 1:
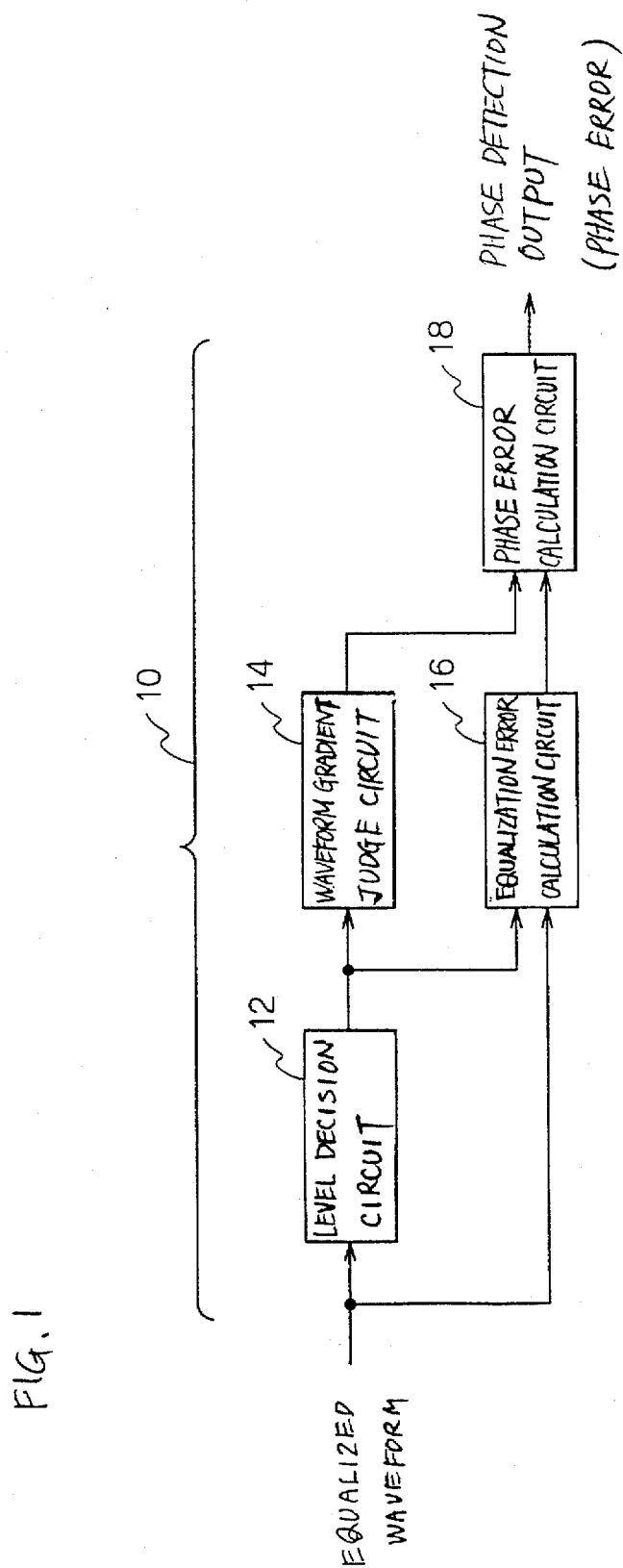
FIG. 1 is a block circuit diagram showing a construction of a phase detector according to the present invention.

FIG. 1 is a block diagram showing a basic construction of a phase detector according to the present invention. The phase detector will be described with reference to FIG. 1.

A phase detector 10 of the present invention comprises a level decision circuit 12 for determining one of a plurality of aimed equalization levels determined in the partial response signalling system which is the closest ao a sampled value of an equalized waveform equalized substantially to the waveform of the partial response signalling system, a waveform gradient judge circuit 14 for determining a gradient of the equalized waveform on the basis of the aimed equalization level determined by the level decision circuit 12, an equalization error calculation circuit 16 for calculating an equalization error which is a difference between the sampled value of the equalized waveform and the aimed equalization level determined by the level decision circuit 12 and a phase error calculation circuit 18 for detecting a phase error on the basis of the equalization error calculated by the equalization error calculation circuit 16 and the gradient of the equalized waveform determined by the waveform gradient judge circuit 14. The phase detector 10 can be realized by using, for example, IC, microcomputer or digital signal processor (DSP), etc.

Figure 2:
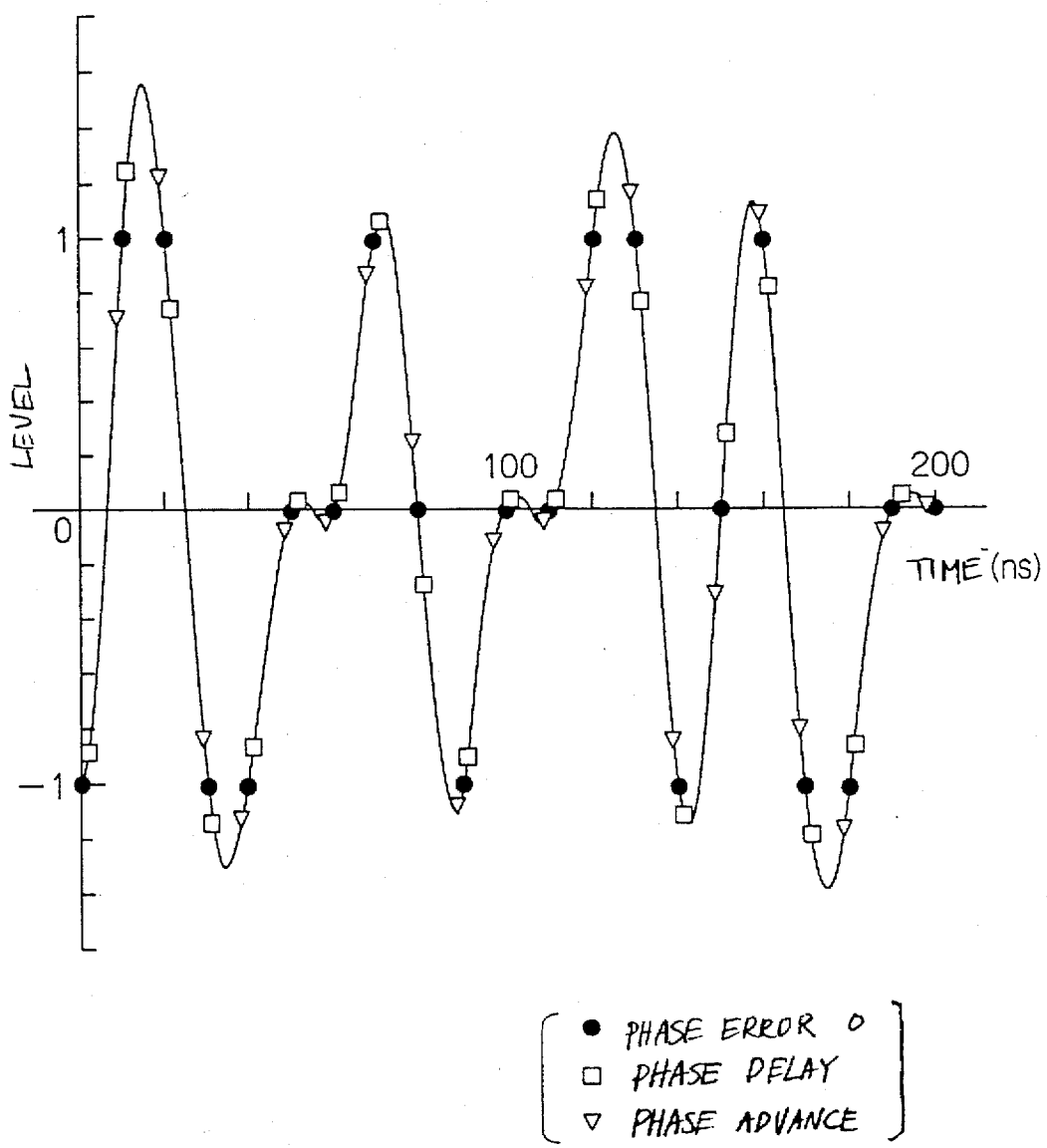
FIG. 2 is a graph showing an example of equalized waveform.

FIG. 2 shows a waveform of an example of the equalized waveform. An operation of the phase detector 10 will be described by taking a case where the partial response system is class IV as an example, with reference to FIGS. 1 and 2. Incidentally, the partial response system class IV will be referred to as "PR-IV", hereinafter.

Referring to FIG. 2, a sampled value of the equalized waveform takes a value of substantially -1, 0 or +1 when the phase error between the equalized waveform and a sampling clock signal is 0. However, when the phase of the sampling clock signal is advanced or delayed with respect to the equalized waveform, the sampled value of the equalized waveform is deviated from an ideal value, resulting in the equalization error. When the gradient of the equalized waveform is positive, the equalization error becomes negative if the phase of the sampling clock signal is advanced and positive if the phase is delayed. On the contrary, when the gradient of the equalized waveform is negative, the equalization error becomes positive if the phase of the sampling clock signal is advanced and negative if the phase is delayed.

The level decision circuit 12 determines one of values −1, 0 and +1 which is the closest to a level of each of a sequence of sampled values of the equalized waveform. The sequence of sampled values of the equalized waveform will be referred to as "equalized waveform sample sequence", hereinafter. Since the equalization error is usually small, the output of the level decision circuit 12 is deemed as the aimed equalization level.

The equalization error calculation circuit 16 calculates the equalization error by obtaining differences between the equalized waveform sample sequence and the output sequence of the level decision circuit 12.

The waveform gradient judge circuit 14 determines whether the gradient of waveform is +1, −1 or 0, on the basis of the output sequence of the level decision circuit 12. First, the sequence of aimed equalization levels determined by the level decision circuit 12 is assumed as . . . , $x_{n-1}$, $x_n$, $x_{n+1}$, . . . The gradient is obtained under the following conditions:

---
If $x_{n-1} = -1$ and $x_n = 1$ and $x_{n+1} = 1$, then gradient is +1;
If $x_{n-1} = 0$ and $x_n = 1$ and $x_{n+1} = 1$, then gradient is +1;
If $x_{n-1} = 0$ and $x_n = 0$ and $x_{n+1} = 1$, then gradient is +1;
If $x_{n-1} = -1$ and $x_n = 0$ and $x_{n+1} = 1$, then gradient is +1;
If $x_{n-1} = -1$ and $x_n = 0$ and $x_{n+1} = 0$, then gradient is +1;
If $x_{n-1} = -1$ and $x_n = -1$ and $x_{n+1} = 1$, then gradient is +1;
If $x_{n-1} = -1$ and $x_n = -1$ and $x_{n+1} = 0$, then gradient is +1;
If $x_{n-1} = 1$ and $x_n = -1$ and $x_{n+1} = -1$, then gradient is −1;
If $x_{n-1} = 0$ and $x_n = -1$ and $x_{n+1} = -1$, then gradient is −1;
If $x_{n-1} = 0$ and $x_n = 0$ and $x_{n+1} = -1$, then gradient is −1;
If $x_{n-1} = 1$ and $x_n = 0$ and $x_{n+1} = -1$, then gradient is −1;
If $x_{n-1} = 1$ and $x_n = 0$ and $x_{n+1} = 0$, then gradient is −1;
If $x_{n-1} = 1$ and $x_n = 1$ and $x_{n+1} = -1$, then gradient is −1;
If $x_{n-1} = 1$ and $x_n = 1$ and $x_{n+1} = 0$, then gradient is −1.
Otherwise, gradient is deemed 0.
---

The phase error calculation circuit 18 outputs the equalization error as the phase error of the sampling clock with respect to the equalized waveform when the gradient of the equalized waveform is +1 and outputs an inversion of the equalization error as the phase error of the sampling clock with respect to the equalized waveform when the gradient of the equalized waveform is −1. When the gradient of the equalized waveform is 0, the phase error calculation circuit 18 outputs 0 so that the equalization error is not reflected back to the phase control.

Figure 3:
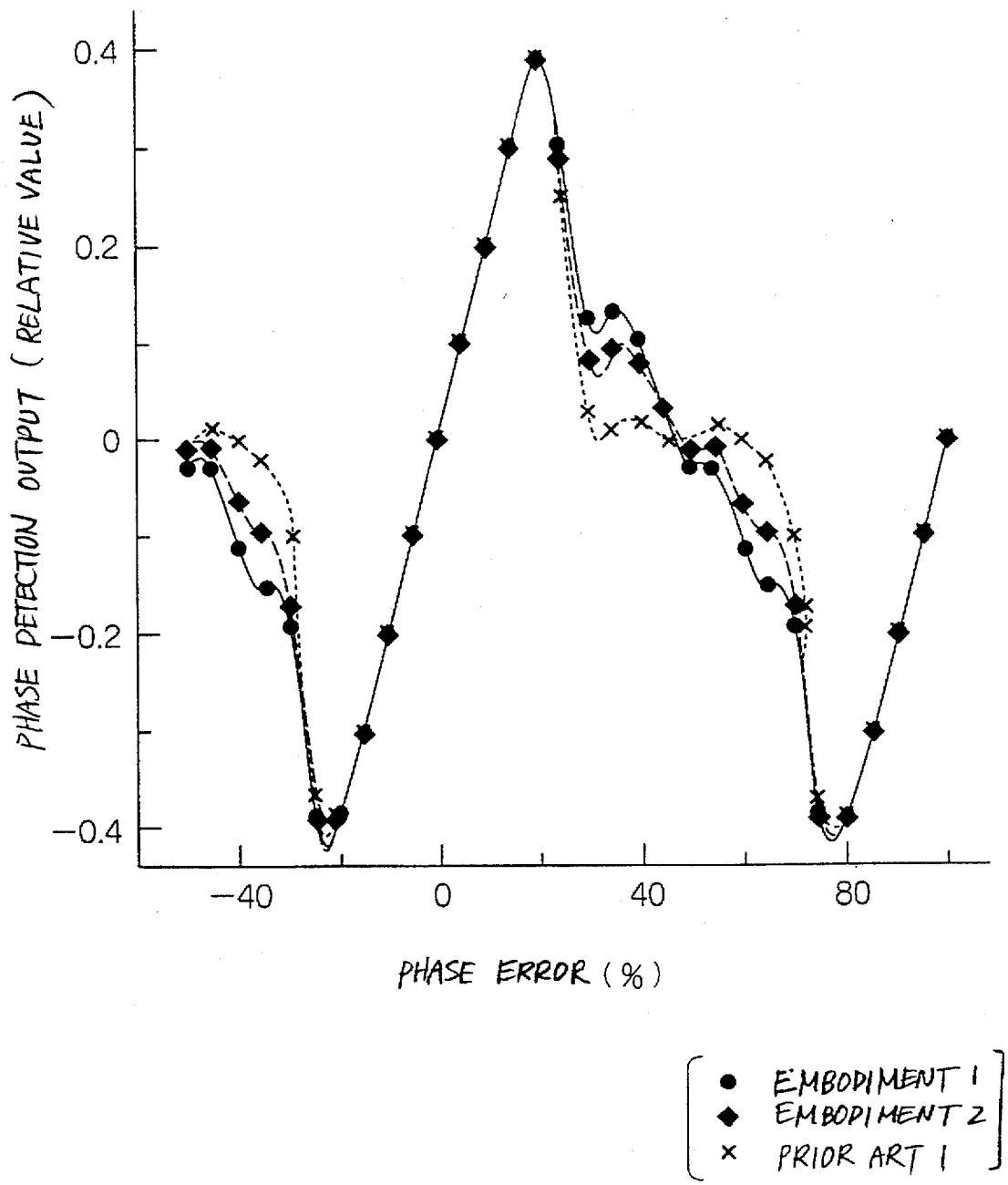
FIG. 3 is a graph showing an example of a relation between a phase error and an output of the phase detector according to the present invention.

FIG. 3 is a graph showing a relation between a true phase error and the detected phase from the phase detector 10, which is obtained by a computer simulation and in which "x", "●" and "♦" are plots of the relations obtained in the prior art 1, the embodiment 1 and the embodiment 2, respectively.

In the prior art 1, the phase error $=-y_n x_{n-1}+y_{n-1}x_n$ is obtained by using the equalized waveform sample value $y_n$ and $x_n$ obtained by ternary symbol-by-symbol decision of the sample value. Since, in the prior art 1, the output of the phase detector becomes substantially 0 in a region in which the phase error is −30% or less and in a region in which the phase error is in a range from +30% to +60%, the phase control becomes impossible in these regions. These regions correspond to the metastable points mentioned previously.

The embodiment 1 operates as described previously. That is, in the embodiment 1, there is substantially no region in which the phase detection output of the phase detector becomes 0, so that the effective phase control is possible regardless of phase error.

The embodiment 2 differs in operation of the waveform gradient judge circuit 14 from the embodiment 1. That is, assuming the sequence of level decision results being . . . , $x_{n-1}$, $x_n$, $x_{n+1}$, . . . , the waveform gradient is +1 if $x_{n+1}>x_{n-1}$, 0 if $x_{n+1}=x_{n-1}$ and −1 if $x_{n+1}<x_{n-1}$. As in the embodiment 1, the region is which the phase detection output becomes 0 is very small in the embodiment 2, so that the effective phase control is possible regardless of phase error. Further, the embodiment 2 is advantageous in that a logical structure of the waveform gradient calculation circuit 14 becomes simpler compared with that of the embodiment 1.

Figure 4:
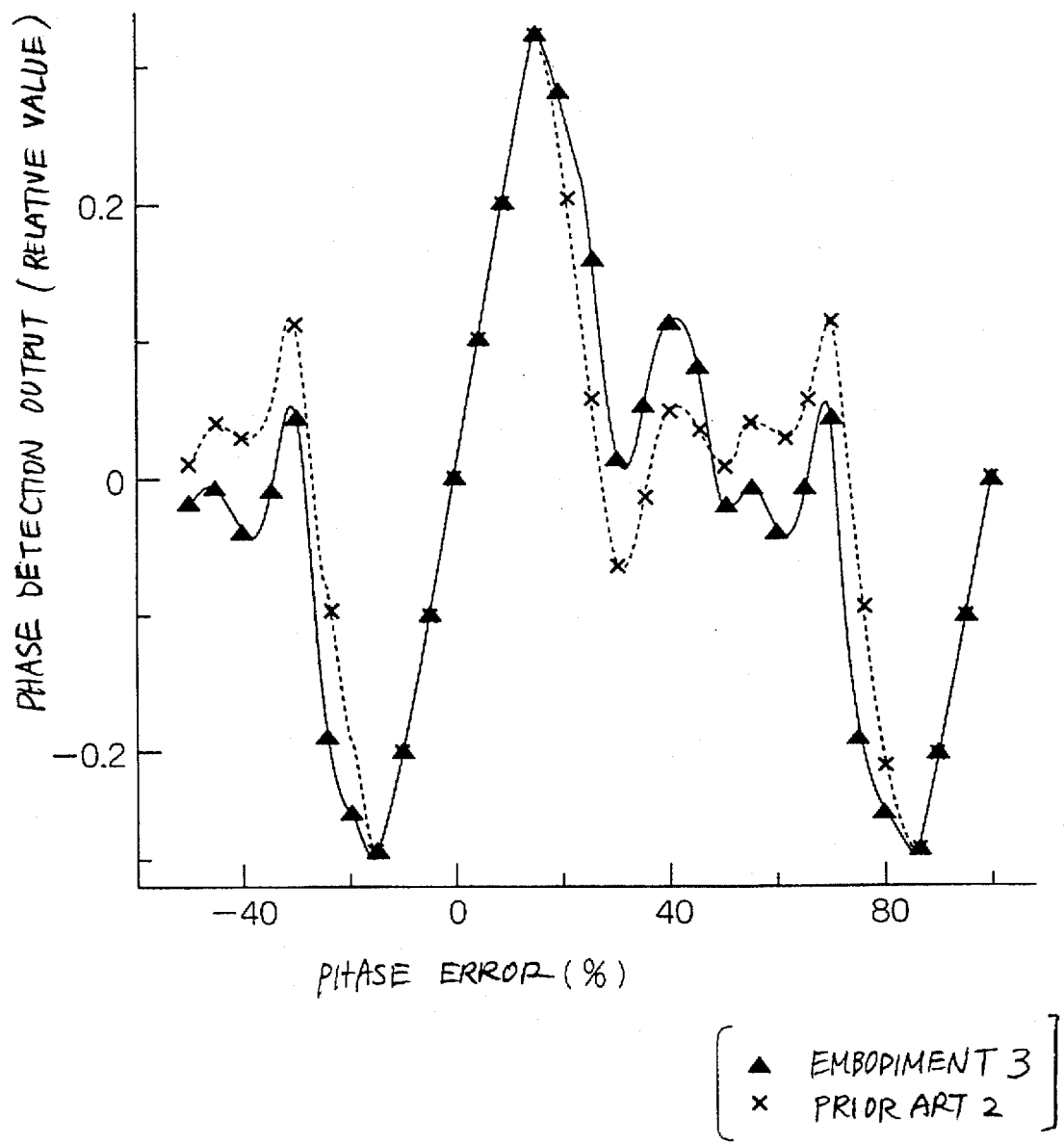
FIG. 4 is a graph showing another example of a relation between a phase error and an output of the phase detector according to the present invention.

FIG. 4 is a graph showing a relation between a true phase error and the detected phase from the phase detector 10, which is obtained by a computer simulation. In FIG. 4, "▲" is a plot of the relation obtained in an embodiment 3 and "x" is a plot of the relation obtained in the prior art 2. In the embodiment 3 shown in FIG. 4, the extended partial response IV (EPR-IV) system is used as the partial response system. As details of the EPR-IV system, F. Dalivo, R. Hermann and S. Ölcer, "performance and Sensitivity Analysis of Maximum Likelihood Sequence Detection on Magnetic Channels", IEEE Transaction on Magnetics, Vol. 25, No. 5, September 1989, p. 4072–4074 is to be referred to.

The prior art 2 uses the equalized waveform sample value $y_n$ and $x_n$ obtained by ternary symbol-by-symbol decision of the sample value to obtain the phase error$=-y_n x_{n-1}+y_{n-1}x_n$. Since, in the prior art 2, the output of the phase detector becomes substantially 0 or the sign thereof is inverted in a region in which the phase error is −25% or less and in a region in which the phase error is +25% or more, the phase control becomes impossible in these regions.

In the embodiment 3, the waveform gradient judge circuit 14 operates, under the assumption of the sequence of level decision results being . . . , $x_{n-1}$, $x_n$, $x_{n+1}$, . . . , to provide the waveform gradient of +1 if $x_{n+1}>x_{n-1}$, 0 if $x_{n+1}=x_{n-1}$ and −1 if $x_{n+1}<x_{n-1}$. In the embodiment 3, the region in which the phase detection output becomes 0 is in a region in which the phase error is −30% or less and in a region in which the phase error is +30% or more. Therefore, the range of the phase error in which the effective phase control is possible is wider.

Figure 5:
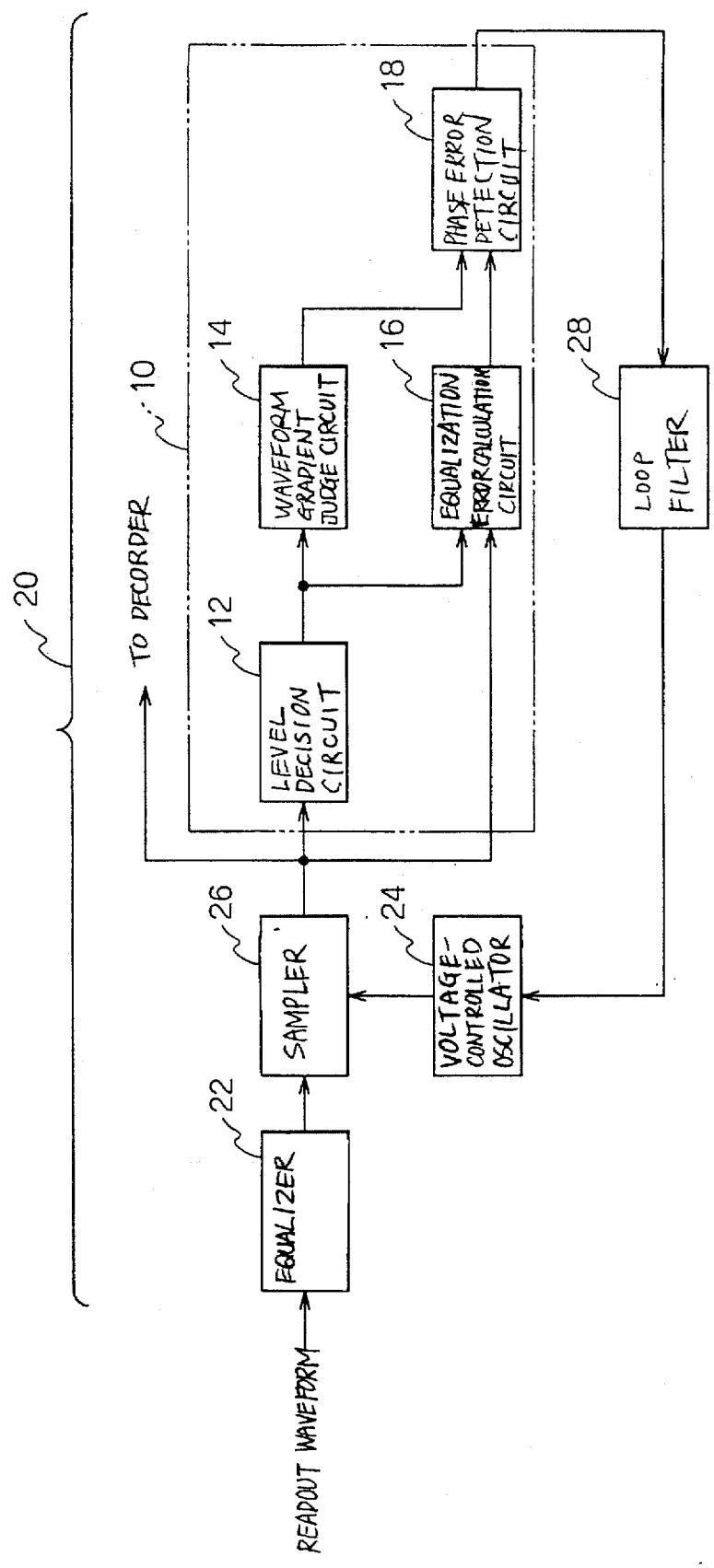
FIG. 5 is a block circuit diagram showing an embodiment of a readout processing circuit of a magnetic storage device according to the present invention.

FIG. 5 is a block circuit diagram of an embodiment of a readout processing circuit of a magnetic disk drive according to the present invention in which the same or corresponding circuit components as those shown in FIG. 1 are depicted by the same reference numerals without detailed description of them.

The magnetic disk drive 20 comprises an equalizer 22 for substantially equalizing a readout signal waveform from a magnetic head to a waveform of the partial response signalling system, a voltage controlled oscillator 24 for generating a sampling clock signal, a sampler 26 for sampling the equalized signal waveform from the equalizer 22 synchronized with the sampling clock signal from the voltage controlled oscillator 24, a level decision circuit 12 for determining one of a plurality of aimed equalization levels determined in the partial response signalling system which is the closest to a sampled value of an equalized waveform equalized substantially to the waveform of the partial response signalling system, a waveform gradient judge circuit 14 for determining a gradient of the equalized waveform on the basis of the aimed equalization level determined by the level decision circuit 12, an equalization error calculation circuit 16 for calculating an equalization error which is a difference between the sampled value of the equalized waveform and the aimed equalization level determined by the level decision circuit 12, a phase error calculation circuit 18 for detecting a phase error on the basis of the equalization error calculated by the equalization error calculation circuit 16 and the gradient of the equalized waveform determined by the waveform gradient judge circuit 14 and a loop filter 28 for producing a control signal for controlling the oscillation frequency of the voltage controlled oscillator 24 on the basis of the phase error and operates to synchronize the sampling clock signal with the equalized waveform.

Since the magnetic disk drive 20 uses the phase detector 10, the phase control is effectively performed and it is possible to obtain a sampling clock signal having stable phase.

A first major effect of the phase detector of the present invention is that the phase error range in which the phase control is effective is wide. That is, the possibility of error in a necessary phase control, which is caused by zero phase detection, is small since, in the relation between the phase error and the phase detection output of the phase error detector, the phase error range in which the phase detection output becomes 0 is very narrow.

A second major effect of the present invention is that the residual phase error between the readout signal and the sampling clock signal is small. That is, it is possible to detect the waveform data having no phase error since the phase error detected from the sampling data is controlled such that the phase error becomes 0.

The magnetic disk drive using the phase detector is reliable with respect to read error. That is, the possibility of false locking is substantially reduced by the phase-stabilized sampling clock signal caused by the effective phase control.

While the present invention has been described with reference to illustrative embodiments, this description is not intended to be construed in a limiting sense. Various modifications of the illustrative embodiments, as well as other embodiments of the present invention, will be apparent to persons skilled in the art upon reference to this description. It is, therefore, contemplated that the appended claims will cover any such modifications or embodiments as fall within the true scope of the present invention.

What is claimed is:

1. A phase detector comprising:
   level decision means for determining one of a plurality of aimed equalization levels predetermined in the partial response signalling system which is the closest to a sampled value of an equalized waveform equalized substantially to a waveform of the partial response signalling system;
   waveform gradient judge means for determining a gradient of the equalized waveform on the basis of the aimed equalization level determined by said level decision means;
   equalization error calculation means for calculating an equalization error which is a difference between the sampled value of the equalized waveform and the aimed equalization level determined by said level decision means; and
   phase error detecting means for detecting a phase error on the basis of the equalization error calculated by said equalization error calculation means and the gradient of the equalized waveform determined by said waveform gradient judge means.

2. A phase detector as claimed in claim 1, wherein said waveform gradient judge means determines a gradient of the equalized waveform as having a value which is one of +1, 0 and −1 and said phase error calculation means outputs the equalization error as the phase error when the gradient value is +1, outputs 0 as the phase error when the gradient value is 0 and outputs an inversion of the equalization error as the phase error when the gradient value is −1.

3. A phase detector as claimed in claim 2, wherein a class IV partial response system in which the aimed equalization levels are 1, 0 and −1 is used and, assuming the values of the aimed equalization levels determined by said level decision means at time instances n−1, n and n+1 being $x_{n-1}$, $x_n$ and $x_{n+1}$, respectively, said waveform gradient judge means determines the gradient of waveform as $$
\begin{aligned}
&+1 \text{ if } x_{n-1} = -1 \text{ and } x_n = 1 \text{ and } x_{n+1} = 1, \\
&+1 \text{ if } x_{n-1} = 0 \text{ and } x_n = 1 \text{ and } x_{n+1} = 1, \\
&+1 \text{ if } x_{n-1} = 0 \text{ and } x_n = 0 \text{ and } x_{n+1} = 1, \\
&+1 \text{ if } x_{n-1} = -1 \text{ and } x_n = 0 \text{ and } x_{n+1} = 1, \\
&+1 \text{ if } x_{n-1} = -1 \text{ and } x_n = 0 \text{ and } x_{n+1} = 0, \\
&+1 \text{ if } x_{n-1} = -1 \text{ and } x_n = -1 \text{ and } x_{n+1} = 1, \\
&+1 \text{ if } x_{n-1} = -1 \text{ and } x_n = -1 \text{ and } x_{n+1} = 0, \\
&-1 \text{ if } x_{n-1} = 1 \text{ and } x_n = -1 \text{ and } x_{n+1} = -1, \\
&-1 \text{ if } x_{n-1} = 0 \text{ and } x_n = -1 \text{ and } x_{n+1} = -1, \\
&-1 \text{ if } x_{n-1} = 0 \text{ and } x_n = 0 \text{ and } x_{n+1} = -1, \\
&-1 \text{ if } x_{n-1} = 1 \text{ and } x_n = 0 \text{ and } x_{n+1} = -1, \\
&-1 \text{ if } x_{n-1} = 1 \text{ and } x_n = 0 \text{ and } x_{n+1} = 0, \\
&-1 \text{ if } x_{n-1} = 1 \text{ and } x_n = 1 \text{ and } x_{n+1} = -1, \\
&-1 \text{ if } x_{n-1} = 1 \text{ and } x_n = 1 \text{ and } x_{n+1} = 0, \text{ and} \\
&\text{otherwise, 0.}
\end{aligned}
$$

4. A phase detector as claimed in claim 2, wherein, assuming the values of the aimed equalization levels determined by said level decision means at time instances n−1 n and n+1 being $x_{n-1}$, $x_n$, and $x_{n+1}$, respectively, said waveform gradient judge means determines the gradient of waveform at a time instance n as $$
\begin{aligned}
&+1 \text{ if } x_{n+1} > x_{n-1}, \\
&0 \text{ if } x_{n+1} = x_{n-1}, \text{ and} \\
&-1 \text{ if } x_{n+1} < x_{n-1}.
\end{aligned}
$$

5. A magnetic storage device comprising:
   an equalizer for substantially equalizing a readout signal waveform from a magnetic head to a waveform of the partial response signalling system;
   a voltage controlled oscillator for generating a sampling clock signal;
   sampling means for sampling the equalized signal waveform from said equalizer synchronized with the sampling clock signal from said voltage controlled oscillator;
   level decision means for determining one of a plurality of aimed equalization levels determined in the partial response signalling system which is the closest to a sampled value of an equalized waveform equalized substantially to the waveform of the partial response signalling system;
   waveform gradient judge means for determining a gradient of the equalized waveform on the basis of the aimed equalization level determined by said level decision means;
   equalization error calculation means for calculating an equalization error which is a difference between the sampled value of the equalized waveform and the aimed equalization level determined by said level decision means;
   phase error detecting means for detecting a phase error on the basis of the equalization error calculated by said equalization error calculation means and the gradient of the equalized waveform determined by said waveform gradient judge means; and a loop filter for producing a control signal for controlling the oscillation frequency of said voltage controlled oscillator on the basis of the phase error.

6. A magnetic storage device as claimed in claim 5, wherein said waveform gradient judge means determines a gradient of the equalized waveform as having a value which is one of +1, 0 and −1 and said phase error calculation means outputs the equalization error as the phase error when the gradient value is +1, outputs 0 as the phase error when the gradient value is 0 and outputs an inversion of the equalization error as the phase error when the gradient value is −1.

7. A magnetic storage device as claimed in claim 5, wherein the class IV partial response system in which the aimed equalization levels are 1, 0 and −1 is used and, assuming the values of the aimed equalization levels determined by said level decision means at time instances n−1, n and n+1 being $x_{n-1}$, $x_n$ and $x_{n+1}$, respectively, said waveform gradient judge means determines the gradient of waveform as +1 if $x_{n-1} = -1$ and $x_n = 1$ and $x_{n+1} = 1$,
+1 if $x_{n-1} = 0$ and $x_n = 1$ and $x_{n+1} = 1$,
+1 if $x_{n-1} = 0$ and $x_n = 0$ and $x_{n+1} = 1$,
+1 if $x_{n-1} = -1$ and $x_n = 0$ and $x_{n+1} = 1$,
+1 if $x_{n-1} = -1$ and $x_n = 0$ and $x_{n+1} = 0$,
+1 if $x_{n-1} = -1$ and $x_n = -1$ and $x_{n+1} = 1$,
+1 if $x_{n-1} = -1$ and $x_n = -1$ and $x_{n+1} = 0$,
−1 if $x_{n-1} = 1$ and $x_n = -1$ and $x_{n+1} = -1$,
−1 if $x_{n-1} = 0$ and $x_n = -1$ and $x_{n+1} = -1$,
−1 if $x_{n-1} = 0$ and $x_n = 0$ and $x_{n+1} = -1$,
−1 if $x_{n-1} = 1$ and $x_n = 0$ and $x_{n+1} = -1$,
−1 if $x_{n-1} = 1$ and $x_n = 0$ and $x_{n+1} = 0$,
−1 if $x_{n-1} = 1$ and $x_n = 1$ and $x_{n+1} = -1$,
−1 if $x_{n-1} = 1$ and $x_n = 1$ and $x_{n+1} = 0$, and
otherwise, 0.

8. A magnetic storage device as claimed in claim 5, wherein, assuming the values of the aimed equalization levels determined by said level decision means at time instances n−1, n and n+1 being $x_{n-1}$, $x_n$ and $x_{n+1}$, respectively, said waveform gradient judge means determines the gradient of waveform at a time instance n as +1 if $x_{n+1} > x_{n-1}$,
0 if $x_{n+1} = x_{n-1}$, and
−1 if $x_{n+1} < x_{n-1}$.

* * * * *